United States Patent
Chappell et al.

(10) Patent No.: US 11,789,503 B1
(45) Date of Patent: Oct. 17, 2023

(54) APPARATUS FOR A CREDENTIAL VERIFICATION SYSTEM WITH A WATER-RESISTANT AND TAMPER-PROOF HOUSING

(71) Applicant: Quick Quack Car Wash Holdings, LLC, Roseville, CA (US)

(72) Inventors: Christopher Clinton Chappell, Lincoln, CA (US); McNamara Marlow Pope, III, Fair Oaks, CA (US); Rodney Daniel Sparks, Antelope, CA (US); Christopher Michael Jenkins, Citrus Heights, CA (US); Bradly Troy Wyatt, Citrus Heights, CA (US); William Gene Ashe, Rocklin, CA (US); David Ellis Collins, Citrus Heights, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/200,427

(22) Filed: May 22, 2023

(51) Int. Cl.
  *G06F 1/18* (2006.01)
  *G06F 1/16* (2006.01)
  *G06F 21/86* (2013.01)
  *G06F 21/32* (2013.01)

(52) U.S. Cl.
  CPC ............ *G06F 1/181* (2013.01); *G06F 1/1681* (2013.01); *G06F 21/32* (2013.01); *G06F 21/86* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 9,870,648 | B2 * | 1/2018 | Moran | G08G 1/149 |
| 11,495,059 | B2 * | 11/2022 | Moran | G07F 17/246 |
| 11,574,507 | B2 * | 2/2023 | Moran | G06Q 10/02 |
| 2010/0319950 | A1 * | 12/2010 | Chang | G06F 1/181 |
| | | | | 174/50 |
| 2012/0322357 | A1 * | 12/2012 | Zhang | G06F 1/181 |
| | | | | 454/339 |
| 2020/0193722 | A1 * | 6/2020 | Moran | G06Q 20/401 |
| 2023/0082134 | A1 * | 3/2023 | Martin | G06Q 50/30 |
| | | | | 382/103 |
| 2023/0104923 | A1 * | 4/2023 | Lu | H04L 63/08 |
| | | | | 726/4 |
| 2023/0186687 | A1 * | 6/2023 | Moran | G06Q 10/02 |
| | | | | 705/5 |

* cited by examiner

*Primary Examiner* — Lisa Lea-Edmonds
(74) *Attorney, Agent, or Firm* — CALDWELL INTELLECTUAL PROPERTY LAW

(57) ABSTRACT

An apparatus for a credential verification system with a water-resistant and tamper-proof housing, wherein the apparatus includes a credential verification system including image capturing devices, and a housing containing a multi-layer enclosure containing a first set of vents, a bottom plate attached to the multi-layer enclosure, wherein the bottom plate contains a second set of vents, an opening plate configured to mount the credential verification system, wherein the opening plate includes a mechanical interface configured to mechanically connect the opening plate to the bottom plate and a locking mechanism configured to removably attach the opening plate to the multi-layer enclosure and the bottom plate, and a view window, wherein the credential verification system is configured to identify a credential through the view window using the plurality of image capturing device, and an airflow is directed from the second set of vents to the first set of vents.

20 Claims, 9 Drawing Sheets

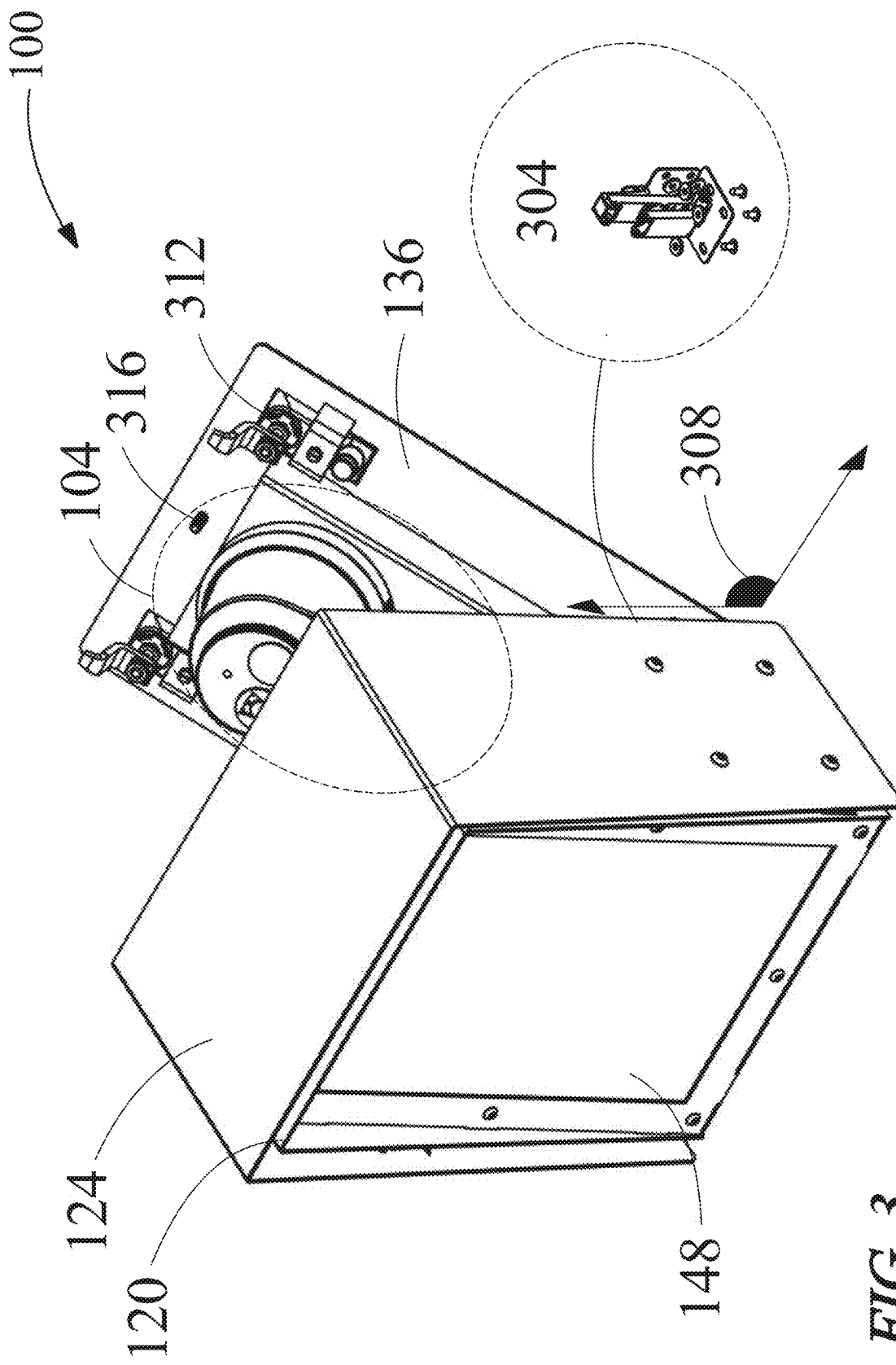

APPARATUS FOR A CREDENTIAL VERIFICATION SYSTEM WITH A WATER-RESISTANT AND TAMPER-PROOF HOUSING

FIELD OF THE INVENTION

The present invention generally relates to the field of housing design and construction. In particular, the present invention is directed to an apparatus for a credential verification system with a water-resistant and tamper-proof housing.

BACKGROUND

The automotive industry has undergone significant growth in recent years, with millions of vehicles on the roads worldwide. Accurately identifying vehicles has long been a labor-intensive task that can create inefficiencies. Currently, existing vehicle identification systems are inefficient. Existing technology does not suffice to alleviate this problem.

SUMMARY OF THE DISCLOSURE

In an aspect, an apparatus for a credential verification system with a water-resistant and tamper-proof housing is described. The apparatus includes a credential verification system including a plurality of image capturing devices, and a housing configured to enclose the credential verification system, wherein the housing includes a multi-layer enclosure containing a first set of vents, a bottom plate attached to the multi-layer enclosure, wherein the bottom plate contains a second set of vents, an opening plate configured to mount the credential verification system, wherein the opening plate includes a mechanical interface configured to mechanically connect the opening plate to the bottom plate and a locking mechanism configured to removably attach the opening plate to at least a rear edge of the multi-layer enclosure, and at least a view window removably attached to at least a front edge of the multi-layer enclosure and the bottom plate, wherein the credential verification system is configured to identify a credential through the at least a view window using the plurality of image capturing device, and an airflow is directed from the second set of vents to the first set of vents.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is an exemplary embodiment of an opening plate that provides serviceability to apparatus 100;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for a credential verification system with a water-resistant and tamper-proof housing. The apparatus includes a credential verification system including a plurality of image capturing devices, and a housing configured to enclose the credential verification system, wherein the housing includes a multi-layer enclosure containing a first set of vents, a bottom plate attached to the multi-layer enclosure, wherein the bottom plate contains a second set of vents, an opening plate configured to mount the credential verification system, wherein the opening plate includes a mechanical interface configured to mechanically connect the opening plate to the bottom plate and a locking mechanism configured to removably attach the opening plate to at least a rear edge of the multi-layer enclosure, and at least a view window removably attached to at least a front edge of the multi-layer enclosure and the bottom plate, wherein the credential verification system is configured to identify a credential through the at least a view window using the plurality of image capturing device, and an airflow is directed from the second set of vents to the first set of vents. Exemplary embodiments illustrating aspects of the present disclosure are described below in the context of several specific examples.

Figure 1:
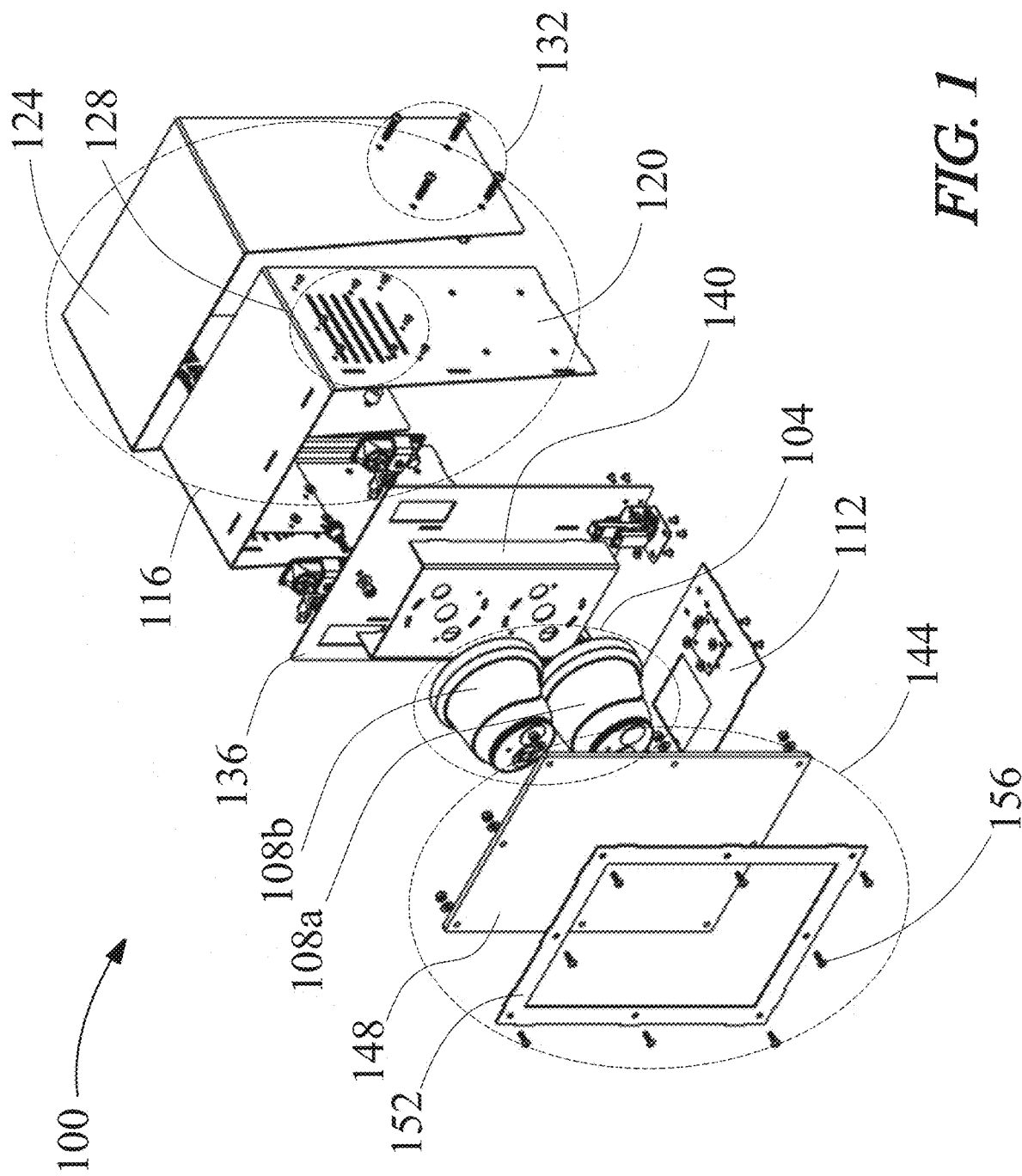
FIG. 1 is an exploded view of an exemplary embodiment of an apparatus for a credential verification system with a water-resistant and tamper-proof housing.

Now referring to FIG. 1, an exploded view of an exemplary embodiment of apparatus 100 for a credential verification system 104 with a water-resistant and tamper-proof housing is illustrated. Apparatus 100 includes a credential verification system 104 configured to identify a credential. As used in the current disclosure, a "credential verification system" is a system used to verify the credentials of a user. Credential verification system 104 may include a processor. Processor may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor may include a single computing device operating independently, or may include two or more computing devices operating in concert, in parallel, sequentially or the like; two or more computing devices may be included together in a single computing device or in two or more computing devices. Processor may interface or communicate with one or more additional devices as described below in further detail via a network interface device. Network interface device may be utilized for connecting processor to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor may include but is not limited to, for example, a computing device or cluster of computing devices in a first location and a second computing device or cluster of computing devices in a second location. Processor may include one or more computing devices dedicated to data storage, security, distribution of traffic for load balancing, and the like. Processor may distribute one or more computing tasks as described below across a plurality of computing devices of computing device, which may operate in parallel, in series, redundantly, or in any other manner used for distribution of tasks or memory between computing devices. Processor may be implemented using a "shared nothing" architecture in which data is cached at the worker, in an embodiment, this may enable scalability of apparatus 100 and/or computing device.

With continued reference to FIG. 1, processor may be designed and/or configured to perform any method, method step, or sequence of method steps in any embodiment described in this disclosure, in any order and with any degree of repetition. For instance, processor may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, In an embodiment, credential verification system 104 may include a plurality of image capturing devices 108a-b, wherein each image capturing device of plurality of image capturing devices 108a-b may be configured to capture image data containing credential as described below with reference to FIGS. 4A-B. Credential verification system 104 may include a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared.

Still referring to FIG. 1, as used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image. Additional disclosure related to the types of cameras used in a credential verification system 104 may be found in U.S. patent application Ser. No. 18/195,537 filed on May 10, 2023, entitled "APPARATUS AND METHOD FOR AUTOMATIC LICENSE PLATE RECOGNITION OF A VEHICLE," and U.S. patent application Ser. No. 18/195,597 filed on May 10, 2023, entitled "AN APPARATUS AND METHOD FOR GENERATING A VEHICLE MAINTENANCE ACTIVITY," both of which are incorporated herein by reference in their entirety.

In a non-limiting example, and still referring to FIG. 1, each image capturing device of plurality of image capturing devices 108a-b may include a varifocal dome camera features a varifocal lens that may be adjusted to provide a variable focal length and field of view, wherein the varifocal dome camera may include a dome-shaped housing constructed from a durable material such as metal or plastic and designed to be mounted on an image capturing device mounting plate 140 as described below to provide up to 360 degree coverage of the area being monitored. In some cases, such varifocal dome camera may be configured to capture image data in ultra-high-definition, for example, and without limitation, in 4K resolution.

Still referring to FIG. 1, credential verification system 104 is enclosed by a housing. As used in this disclosure, a "housing" is an enclosed container configured to support, protect, and position a plurality of electrical components. In some cases, housing may be shaped like a cube, a rectangular cuboid, a box, and the like. In some cases, housing may include one or more openings such as, without limitation, a view window, a plurality of vents, an electrical inlet, an ethernet inlet, and the like as described below. In an embodiment, each opening on housing may be configured to be waterproof. In a non-limiting example, housing may be made of a hydrophobic material. As used in this disclosure, a "hydrophobic material" is a material that repels liquid (e.g., water). "Hydrophobic" describes a water-resistant characteristic in a material. Materials with hydrophobic attributes may be impervious to water and water vapor. Materials with hydrophobic attributes may repel water. Hydrophobic materials may be configured not to absorb water. Hydrophobic materials may not dissolve in water or in any solution that contains a largely aqueous environment. In one example, hydrophobic material may include a rigid material. In another example, hydrophobic material may include a non-breathable hydrophobic material. As used in this disclosure, a "non-breathable hydrophobic material" is a material that is watertight and airtight. The non-breathable hydrophobic material may be configured to prevent water and humid air from entering the waterproofing housing. In another example, the waterproofing housing may include a superhydrophobic coating. A "superhydrophobic coating," as disclosed herein, is a thin surface layer that repels water. Examples of superhydrophobic coating may include silica nano-coating, carbon nano-tube coating, precipitated calcium carbonate, Zinc oxide polystyrene nano-composite, manganese oxide polystyrene nano-composite, fluorinated silanes and fluoropolymer coatings, and the like.

Continuing referencing to FIG. 1, in one example, hydrophobic material may include a breathable hydrophobic material. As used in this disclosure, a "breathable hydrophobic material" is a material that is watertight but not necessarily airtight. The breathable hydrophobic material may be configured to allow heat and air to exit housing while preventing water from entering housing. Examples of breathable hydrophobic materials may include, without limitation, polycarbonate, polytetrafluoroethylene, plastics, metals, acrylics, epoxies, polyethylene, polystyrene, polyvinylchloride, polydimethylsiloxane, polyesters, polyurethanes, fluoropolymers, and the like. A breathable hydrophobic material may include TEFLON produced by The Chemours Company FC, LLC. A breathable hydrophobic material may also include GORE-TEX produced by W, L. Gore & Associates. In some embodiments, a breathable hydrophobic material may be configured to prevent water vapor from entering housing. In other embodiments, a breathable hydrophobic material may be configured to allow water vapor to escape housing.

Still referring to FIG. 1, housing includes a multi-layer enclosure 116. As used in this disclosure, a "multi-layer enclosure" is a portion of housing composed of multiple layers of protective casing. Each layer may serve a distinct purpose to protect, insulate, or provide structure to credential verification system 104 housing enclosed. Multi-layer enclosure 116 may include a first layer enclosure 120 and a second layer enclosure 124, wherein the first layer enclosure 120 is covered by the second layer enclosure 124. In some cases, first layer enclosure 120 may include a bent steel cover containing at least a vent 128. A "vent," as used in this disclosure, refers to an opening or passage in an enclosure that allows for the exchange of air, heat, or other substance between the interior of the enclosure and the external environment. In An embodiment, vent may be used to help manage the temperature and humidity within housing, especially for electronic devices therein that generate heat during operation. By allowing hot air to escape and cool air to enter, vent may be configured to prevent overheating and maintain optimal operating conditions for credential verification system 104.

Still referring to FIG. 1, vent may include one or more apertures. An "aperture" as used in this disclosure is an opening configured to allow a medium to pass through. In some embodiments, an aperture may include but is not limited to, a flap, a door, a hole, and the like. In some embodiments, an aperture of vent may be moved as a function of an actuator. An "actuator" as used in this disclosure is a device that converts a signal into mechanical and/or electromechanical motion. In some embodiments, the actuator may include but is not limited to, pneumatic, hydraulic, mechanical, and/or electronic actuator. The actuator may include an electronically actuated device such as, but not limited to, a servo, an electromotor, and the like. A computing device may command the actuator to control one or more apertures of one or more vents. Actuator may be configured to increase and/or decrease a size of one or more apertures of vent. In some embodiments, actuator may be configured to direct an airflow through one or more apertures of vent. In some embodiments, actuator may adjust an angle and/or orientation of one or more apertures of vent. For example, in some cases, vent may act as valves and control and/or regulate a flow of fluid. In a non-limiting example, actuator may adjust an angle of one or more apertures of one or more vents which may direct airflow, such as without limitation, a heated airflow, away from electrical components enclosed by housing, such as without limitation, credential verification system 104. In another non-limiting example, actuator may reduce opening of one or more apertures of one or more vents which may prevent external elements from contacting electrical components enclosed by housing.

In one or more embodiments, and still referring to FIG. 1, vent (and/or aperture) may include various shapes. In a non-limiting example, vent may include simple holes, slits, grilles and/or the like. In some embodiments, vent may include a curved structure. In some embodiments, vent may include a smooth surface. Additionally, or alternatively, vent may include a uniform structure. In some embodiment, vent may be referred to as a plurality of vents. Multi-layer enclosure 116 includes a first set of vents. In a non-limiting example, first layer enclosure 120 (i.e., the enclosure that is proximal to credential verification system) may include first set of vents. First set of vents may include a plurality of vents as described above with reference to FIGS. 2A-B. In some cases, second layer enclosure 124 may be a protective cover made of aluminum material designed to protect components, such as, without limitation, first layer enclosure 120 and components thereof from excessive heat. In a non-limiting example, surfaces of first layer enclosure 120 and second layer enclosure 124 may overlap; for instance, and without limitation, outer surface of first layer enclosure 120 may face the inner surface of second layer enclosure 124. It should be noted that the outer surface of first layer enclosure 120 may not be in contact with the inner surface of second layer enclosure 124, with an airgap therebetween as described below in further detail. In some cases, second layer enclosure 124 may include an aluminum heat shield, configured to reduce radiant heat transfer of apparatus 100. Additionally, or alternatively, second layer enclosure 124 may include a larger upper surface area. Such excess area forward may be configured as, without limitation, a sunshade, a visor, a hood, or the like to protect first layer enclosure 120 and components thereof from one or more environmental factors such as direct sunlight (i.e., by shield the lens of plurality of image capturing devices 108a-b from direct sunlight, wherein the direct sunlight may cause glare and lens flare which may significantly degrade the quality of image data, along with overheating which may lead to decrease performance or damage to plurality of image capturing devices 108a-b), weather elements (i.e., by shield the lens of plurality of image capturing devices 108a-b from rain, snow, and/or wind-blown debris which can cause smearing or damage to the lens), and/or the like.

With continued reference to FIG. 1, housing includes a bottom plate 112 attached to multi-layer enclosure 116. As used in this disclosure, a "bottom plate" is a lowermost component or structure of housing. In a non-limiting example, bottom plate 112 may include a bottom surface of housing, while multi-layer enclosure 116 may include a left surface, upper surface, and a right surface of housing as shown in FIG. 1. In some cases, bottom plate may be attached to first layer enclosure 120 of multi-layer enclosure 116 using a plurality of alignment feature as described below with reference to FIGS. 2A-B. Additionally, or alternatively, bottom plate 112 includes a second set of vents. Each vent of second set of vents may include any vent as described above. In a non-limiting example, first layer enclosure 120 of multi-layer enclosure 116 may be mounted on a (steel) bottom plate 112, wherein the bottom plate 112 may serve as a base or foundation of housing.

With continued reference to FIG. 1, second layer enclosure 124 may be fixed on top of first layer enclosure 120 using a first set of tamper-resistant hardware 132. As used in this disclosure, tamper-resistant hardware" are components configured to prevent or deter unauthorized access, modification, or damage). For example, and without limitation, plurality of tamper-resistant hardware may include a plurality of specialized fasteners or other locking mechanisms to prevent tampering or unauthorized access, such as screws with unique heads that require specialized tools for removal. Exemplary embodiment of tamper-resistant hardware 132 may include security screws, breakaway nuts, shear bolts, one-way screws, and/or the like. A "fastener," as described herein, is a physical component that is designed and/or configured to attach or fasten two (or more) components together. In other embodiments, a fastener may include a buckle, a slide fastener, one or more snaps, one or more buttons, or one or more clasps. Fastener may include an attachment device that has a quick-release mechanism, defined as a mechanism having a member which, when pulled, causes the attachment device to detach rapidly. As a non-limiting example, the fastener may include a quick-release buckle such as the SNAPDRAGON quick-release buckles produced by Illinois Tool Works of Glenview, Illinois. The fastener may be slide-release buckle. The fastener may be a double-loop frame-style buckle. The fastener may be a single-loop frame-style buckle. The fastener may be a prong frame-style buckle. The fastener may be a plate buckle. The fastener may be a box-out buckle. The fastener may be a clip buckle. The fastener may be a snap buckle. A strap fastener may include one or more fasteners for attaching together two or more straps. Fastener may be a slide-release buckle. The fastener may be a double-loop frame-style buckle. The fastener may be a single-loop frame-style buckle. The fastener may be a prong frame-style buckle. The fastener may be a plate buckle. The fastener may be a box-out buckle. The fastener may be a clip buckle. The fastener may be a snap buckle. The fastener may be a clasp. The fastener may be a tension lock. The fastener may be a ladder lock. The fastener may be a tri-glide. The fastener may be adjustable. Some fasteners, such as the double loop buckle or ladder lock, are inherently adjustable. A fastener that is not adjustable inherently may be made adjustable by including an adjustable form in its design. For example, either the male or female half of a slide-release buckle may be fused to a tension lock through which the strap is threaded, making the slide-release buckle adjustable. The fastener may be composed of any material of sufficient durability, hardness, and elasticity to perform the structural requirements of that type of fastener. The fastener may be metal. The fastener may be a hard polymer such as plastic. Where the fastener is a button, the fastener may be virtually any material sufficiently rigid to catch the buttonhole.

With continued reference to FIG. 1, housing includes an opening plate 136 configured to mount credential verification system 104. As used in this disclosure, an "opening plate" is a removable or adjustable component of housing that provide access to the internal components which requires periodic access for maintenance, adjustments, or otherwise replacement, such as without limitation, credential verification system 104. In an embodiment, opening plate 136 may include an image capturing device mounting plate 140 configured to mount credential verification system 104. For the purpose of this disclosure, an "image capturing device mounting plate" is a type of mounting plate that is designed to provide a secure and stable platform for plurality of image capturing device 108a-b, such as a plurality of cameras to be mounted onto. In an embodiment, image capturing device mounting plate 140 may include a series of pre-drilled holes and threaded inserts that are designed to accommodate a wide range of different image capturing device and mounting hardware. In some cases, at least a pre-drilled hole may serve as an electrical inlet/outlet. As used in the current disclosure, an "electrical inlet/outlet" is a type of opening that provides a place where a plurality of wires of plurality of image capturing devices 108a-b may enter into or exit out from image capturing device mounting plate 140, opening plate 136, and housing. In an embodiment, at least a pre-drilled hole may be configured to house wires which provide the credential verification system 104 with access to the power grid or another source of electricity. An electrical inlet may also be configured to house wires which provide the credential verification system 104 with access to the internet via an ethernet connection.

Still referring to FIG. 1, in other cases, at least a pre-drilled hole may serve as a passage for an image capturing device (e.g., camera lens); for instance, and without limitation, field of view of the image capturing device may be affected by the size and location of the at least a pre-drilled hole. A larger hole may allow for a wider field of view, while a smaller hole may provide a narrow view. Additionally, or alternatively, image capturing device mounting plate 140 may be mounted onto a variety of different surfaces other than opening plate 136, such as walls, ceilings of first layer enclosure 120 of multi-layer enclosure 116 as described above. In some cases, image capturing device mounting plate 140 may be adjusted to ensure that at least an image capturing device of plurality of image capturing device 108a-b is positioned at the desired angle and height within housing. In a non-limiting example, image capturing device mounting plate 140 may include a universal camera standoff plate, wherein the universal camera standoff plate may include a universal design that makes it easy to install and use with a wide range of different cameras and mounting configurations. Such universal camera standoff plate may be mounted on opening plate 136. Opening plate 136 may be removably attached to bottom plate 112 and at least a rear edge of multi-layer enclosure 116 as described below with reference to FIG. 3.

With continued reference to FIG. 1, housing includes at least a view window 144. As used in the current disclosure, a "view window" is a transparent window as an exterior surface of the housing. View window 144 may be made of transparent material or material that can be "see-through." In an embodiment, view window 144 may be used to allow a credential verification system 104 to capture an image in one or more view field of plurality of image capturing devices 108a-b. In a non-limiting example, view window 144 may include a transparent tamper-proof glass panel 148 in the front of plurality of image capturing devices 108a-b, wherein the transparent tamper-proof panel 148 may provide an unobstructed view of the scene being captured while protecting plurality of image capturing devices 108a-b from elements such as, without limitation, dust, moisture, physical damage, and/or the like. Such transparent tamper-proof panel 148 may include a removable smoked polycarbonate window. Other exemplary materials used by view window 144 may include, without limitation, tempered glass, acrylic (i.e., plexiglass), laminated glass, security film, and/or the like. In some cases, view window 144 may be coated or treated to reduce glare and reflections that can interfere with the image quality; counting the non-limiting example, an anti-reflective coating may be applied to the transparent tamper-proof panel 148 to reduce glare, a scratch-resistant coating to improve durability, or a UV-resistant coating to protect view window 144 and components enclosed within housing from damage due to prolonged exposure to sunlight. Additionally, or alternatively, view window 144 may be sealed, for example, and without limitation, using a frame 152 and a second set of tamper-resistant hardware 156 attached to transparent tamper-proof panel 148 configured to enlarge the diameter of view window 144 to better removably attaching view window 144 to at least a front edge of multi-layer enclosure 116 and bottom plate 112 such as at least a front edge of first layer enclosure 120 and bottom plate 112, thereby enclosing credential verification system 104. Second set of tamper-resistant hardware 156 may include any tamper-resistant hardware with a different type, size, or otherwise configuration of first set of tamper-resistant hardware 132 as described above in this disclosure.

Still referring to FIG. 1, as used in this disclosure, "removable attachment" is an attributive term that refers to an attribute of one or more relata to be attached to and subsequently detached from another relata. In a non-limiting example, attaching view window 144 to the at least a front edge of multi-layer enclosure 116 and bottom plate 112 may be done via interference fit (i.e., a type of fit that does not require any fasteners to hold two parts together). In a non-limiting example, the enlarged circumference may cause first layer enclosure 120 and bottom plate 112 and view window 144 to be tightly held together when they are pressed or assembled. The frictional forces between first layer enclosure 120 and bottom plate 112 and view window 144 may create the holding force, which eliminates the need for additional fasteners. Additionally, or alternatively, removable attachment is a relation that is contrary to permanent attachment wherein two or more relata may be attached without any means for future detachment. Exemplary non-limiting methods of permanent attachment include certain uses of adhesives, glues, fasteners, and the like. In some cases, the detachment of two or more relata permanently attached may result in the breakage of one or more of the two or more relata. At least one surface of housing may be attached, using permanent attachment, to opening plate 136 via a mechanical interface as described below with reference to FIG. 3.

Figure 2A:
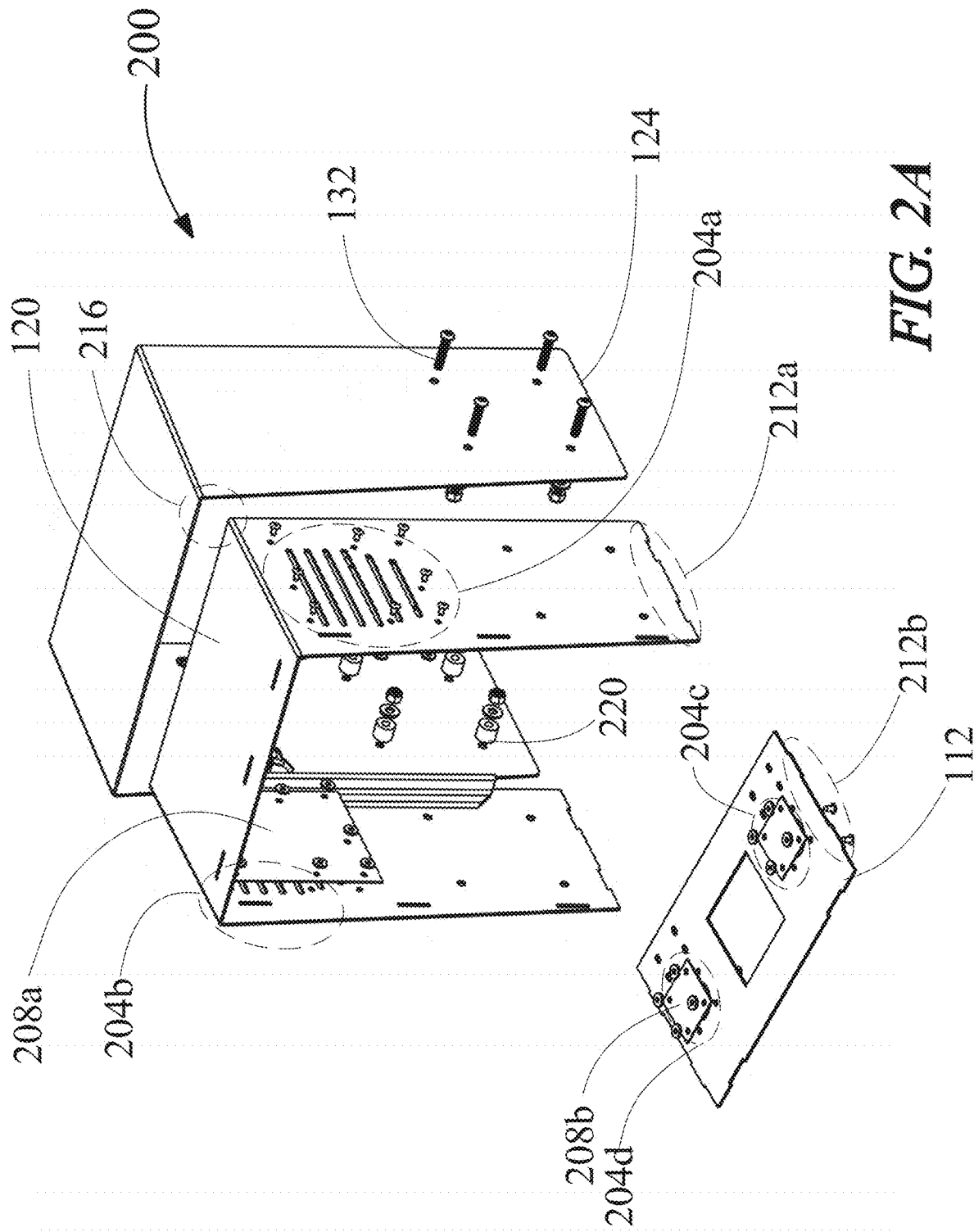
FIG. 2A is an exemplary embodiment of a multi-layer enclosure assembly.

Now referring to FIG. 2A, an exemplary embodiment of multi-layer enclosure assembly 200 is illustrated. Multi-layer enclosure 116 may include a first layer enclosure 120 attached with bottom plate 112. Plurality of vents 204a-d may be disposed around the container formed by the attachment of first layer enclosure 120 and bottom plate 112. Each vent of first set of vents 204a-b may include a plurality of apertures (e.g., ventilation cutouts). In some cases, the size of vent (or the size of apertures) may be varied based on the location of vent. In a non-limiting example, plurality of vents 204a-d may include a first set of vents 204a-b located on one or more surfaces (e.g., left, top, and/or right surface) of first layer enclosure 120. Plurality of vents 204a-d may include a second set of vents 204c-d located on one or more sides (e.g., left and right side) of top/bottom surface of bottom plate 525. In some cases, vents from first set of vents 204a-b may include a plurality of larger apertures compared to vents from second set of vents 204c-d to provide more adequate airflow to the components within housing such as, without limitation, credential verification system 104. Additionally, or alternatively, a wire mesh 208a/b may be placed on top of each vent of plurality of vents 204a-d within housing, configured to block pests from entering housing through plurality of apertures, wherein the "wire mesh," for the purpose of this disclosure, is a grid pattern formed by weaving or welding thin wires together. Wire mesh208a/b may vary in size. In some cases, the size of wire mesh 208a/b may be determined based on the size of vent to be covered. For example, and without limitation, wire mesh 208a/b may include a stainless-steel wire mesh, wherein the stainless-steel wire is a type of wire mesh made from stainless steel wires. A first wire mesh 208a (i.e., wire mesh in a first size) may be configured to cover each vent of first set of vents 204a-b while a second wire mesh 208b (i.e., wire mesh in a second size, wherein the second size is smaller than the first size) may be configured to cover each vent of second set of vents 204c-d. Wire mesh 208a/b may be fixed to the inner surface of first layer enclosure 120 and/or upper surface bottom plate 112 of waterproof housing via a plurality of fasteners such as, without limitation, rivets with washers.

Still referring to FIG. 2A, multi-layer enclosure 116 and/or bottom plate 112 may include a plurality of alignment features 212a-b. As used in this disclosure, "alignment features" are physical features that help to precisely align, interface, or couple one component with another component. In a non-limiting example, plurality of alignment features 212a-b may be configured for precise positioning and attaching bottom plate 112 to first layer enclosure 120 by matching a male/female alignment feature 112b on bottom plate 112 to a female/male alignment feature 112a on first layer enclosure 120. First layer enclosure 120 may include female/male alignment feature 112a including one or more physical notches and/or grooves that allow for precise placement and/or attachment of bottom layer 120 with male/female alignment feature 112b containing one or more physical protrusions that match with the one or more physical notches.

With further reference to FIG. 2A, first layer enclosure 120 along with bottom plate 112 may be covered by second layer enclosure 124. Second layer enclosure 124 may be mechanically fixed to first layer enclosure 120 through first set of tamper resistant hardware 132 as described above. In some cases, second layer enclosure 124 may include a slightly larger height and/or width. Fixing second layer enclosure 124 on top of first layer enclosure 120 may include using a one or more spacers 560 in addition to tamper resistant hardware, wherein the spacers 560 are components used to maintain a specific distance between two objects to separate two objects (e.g., first layer enclosure 120 and second layer enclosure 124). Multi-layer enclosure 116 having first layer enclosure 120 and second layer enclosure 124 further includes an airgap 216 located in between first layer enclosure 120 and second layer enclosure 124. Such difference in height and/or width and utilization of spacers 220 may create airgap 216 (i.e., a space or distance maintained between two layers) between the outer surface of first layer enclosure 120 and the inner surface of second layer enclosure 124. In an embodiment, airgap 216 is configured to circulate the air flow through first set of vents 204a-b. Airgap 216 may prevent the buildup of heat within and/or around housing. In a non-limiting example, airflow may enter into or out of plurality of vents 204a-d through airgap 216, absorbing heat from components within first layer enclosure 120, keeping the temperature inside housing at a desired level (e.g., ambient temperature). The width of airgap 216 may be consistent with the width of the spacer, for example, and without limitation, 0.5 inch.

Figure 2B:
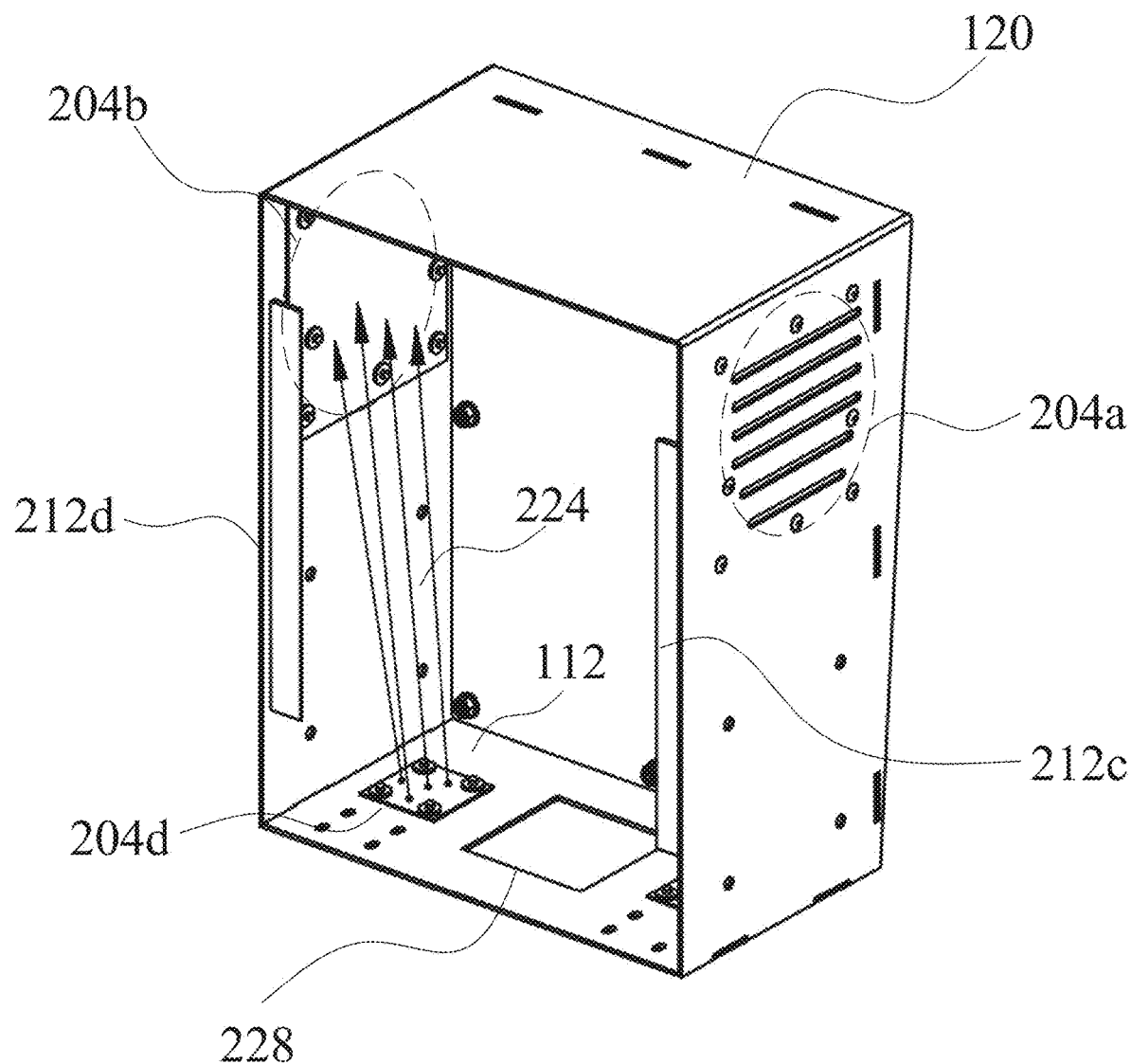
FIG. 2B is an exemplary embodiment of the attachment of a first layer enclosure and a bottom plate.

Referring now to FIG. 2B, an exemplary embodiment of the attachment of first layer enclosure 120 of multi-layer enclosure 116 and bottom plate 112 is illustrated. In an embodiment, the attachment of first layer enclosure 120 and bottom plate 112 may allow an airflow 224 to flow between vents; for instance, and without limitation, airflow 224 may flow from one or more vents of second set of vents 204c-d to one or more vents of first vents 204a-b, maintaining the temperature within the first layer enclosure 120 at a desired level. It should be noted that airflow 224 may flow in another direction; for instance, and without limitation, from one or more vents from first set of vents 204a-b to one or more vents of second set of vents 204c-d. Wire mesh 208a-b may also act as a filter for airflow 224 by trapping dust, dirt, and other particles in the mesh. In a non-limiting example, wire mesh 208a-b covering plurality of vents 204a-d may prevent particles listed above from entering first layer enclosure 120 from outside environment. Additionally, or alternatively, bottom plate 112 may include a cable routing opening 228 (i.e., a hole designed to allow cables or wires to be routed through it) configured to provide a secure and protected pathway for cables or wires of credential verification system 104 (not shown), helping to prevent damage, tangling, or interference with other components of apparatus 100. In some cases, such cable routing opening 228 may be located at the center of bottom plate 112, right below plurality of image capturing devices 108a-b (now shown) as described above.

Still referring to FIG. 2B, other exemplary embodiments of alignment feature may include one or more supporting structures 212c-d. As used in this disclosure, a "supporting structure" is a type of alignment feature designed to provide stability, strength, or support to other components in addition to the alignment of two components. In a non-limiting example, supporting structures 212c-d may include (steel) angle irons. In some cases. Angle irons may include "L-shaped" metal bars used to reinforce and support view window 144 and components thereof (not shown) removably attached to the at least a front edge of first layer enclosure 120 and bottom plate 112. For instance, and without limitation, a first supporting structure 212c may be installed on the right inner surface of first layer enclosure 120 and a second supporting structure 212d may be installed on the left inner surface of first layer enclosure 120, wherein both first and second supporting structure 212c-d may be symmetric.

Now referring to FIG. 3, an exemplary embodiment of opening plate 136 that provides serviceability to apparatus 100 is illustrated. Opening plate 136 may include a mechanical interface. As used in this disclosure, a "mechanical interface" is a physical connection between two or more components. In an embodiment, mechanical interface is configured to mechanically connect opening plate 136 to bottom plate 112. In a non-limiting example, mechanical interface may include at least a hinge 304; for instance, and without limitation, opening plate 136 with image capturing device mounting plate 140 may be hinged to bottom plate 112 through at least a hinge 304, wherein the at least a hinge 304 may be configured to rotate or pivot opening plate 136 relative to bottom plate 112 at an opening angle 308 (i.e., maximum degree to which opening plate 136 can be opened) of 135 degrees, thereby providing access to plurality of image capturing devices 108a-b. Additionally, or alternatively, opening plate 136 includes a locking mechanism 312. A "locking mechanism," refers to a device configured to secure or lock two or more components together, preventing unintentional separation, movement, or access. In a non-limiting example, locking mechanism 312 may include one or more locking latches, mounted to opening plate 136 on an opposite side of at least a hinge 304, configured to engage with at least a rear edge of multi-layer enclosure. In some cases, opening plate 136 may be locked to the rear edge of the top surface of first layer enclosure 120 via one or more locking latches. In some cases, locking mechanism 312 may further include a releasing mechanism configured to allow opening plate 136 to be opened at any degrees within opening angle 308 when desired. Further, opening plate 136 may include a grip knob 316, wherein the "grip knob," for the purpose of this disclosure, is a protruding part configured to manipulate or control attached object such as, without limitation, opening plate 136. In some cases, grip knob 316 may include a textured surface with a cross hatch pattern of small, diamond-shaped rides (e.g., a knurled grip knob). Such textured surface may provide a better grip and make grip knob 316 easier to open/close opening plate 136.

Figure 4A:
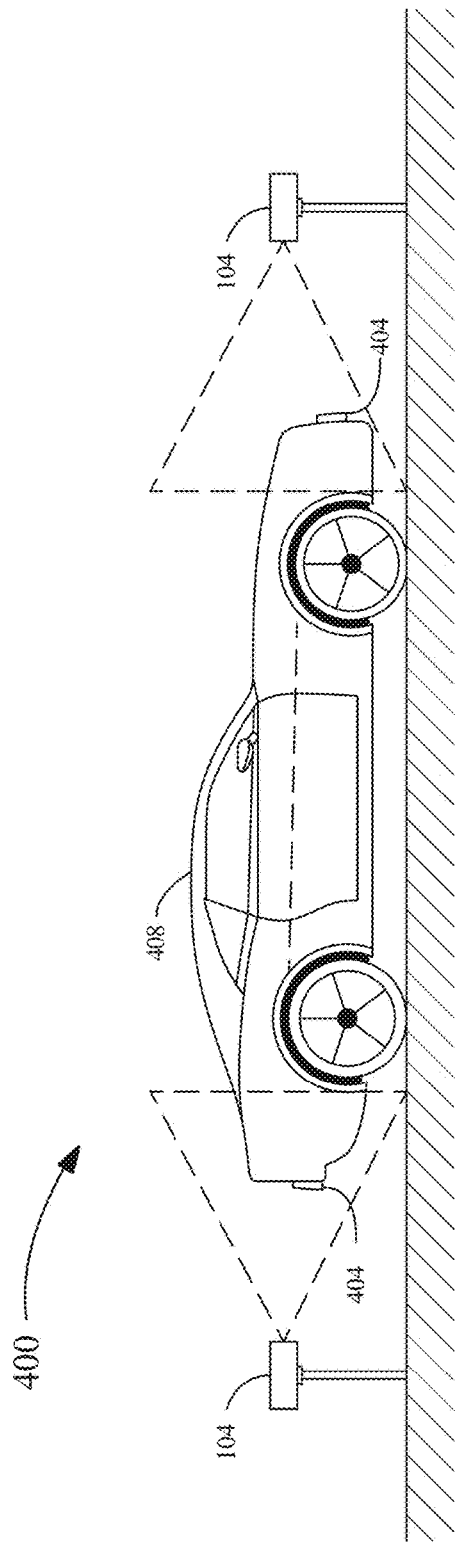
FIG. 4A-C are exemplary embodiments of utilization of credential verification system.
Figure 4B:
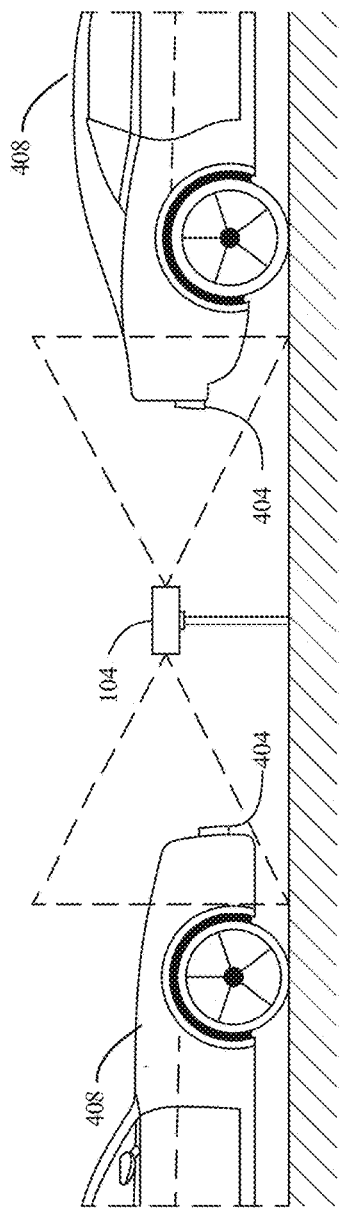
Figure 4C:
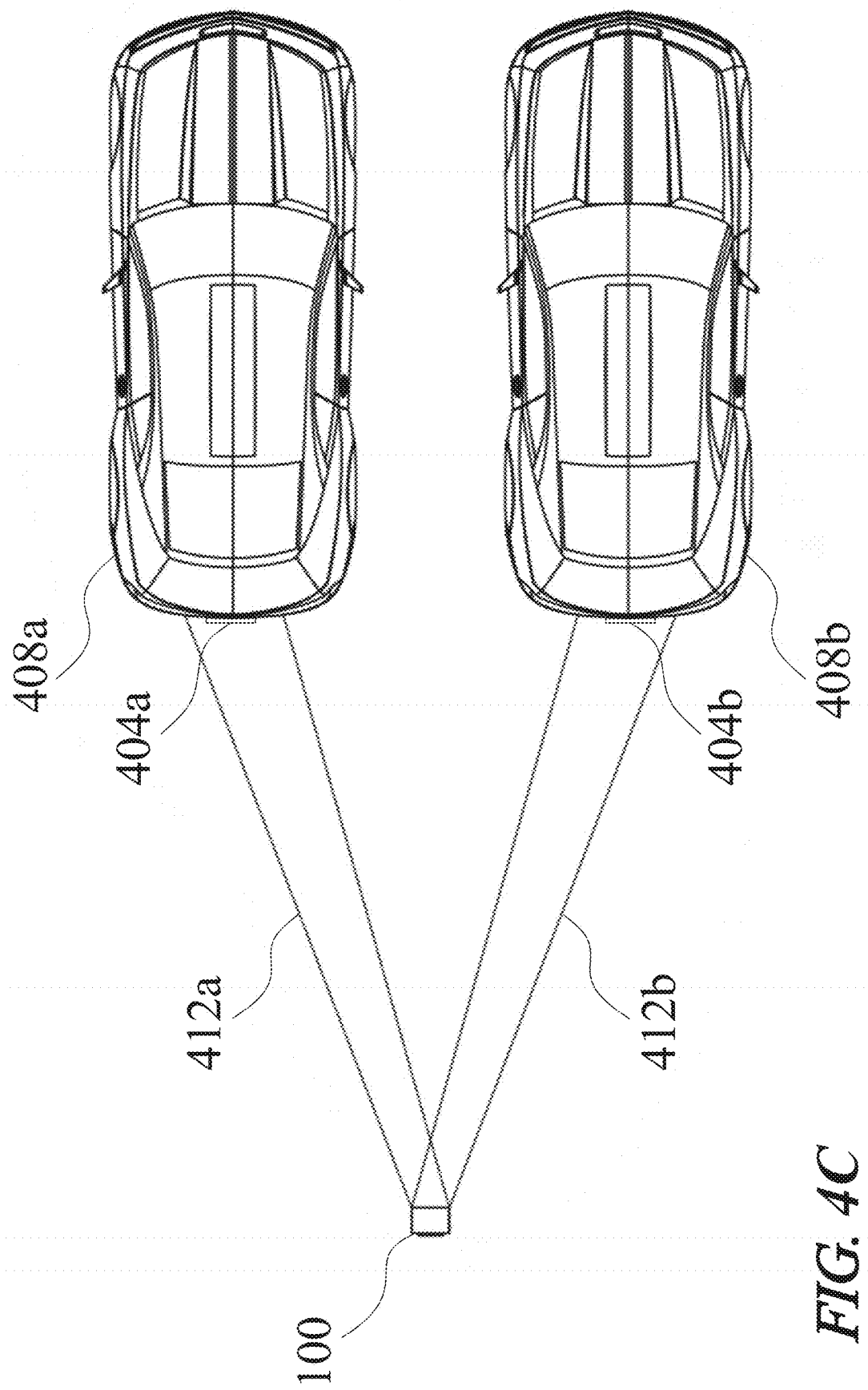

Now referring to FIGS. 4A-C, exemplary embodiments of utilization of credential verification system 104 are illustrated. Credential verification system 104 is configured to identify a credential through at least a view window 144 using plurality of image capturing device 108a-b. In some cases, processor may be configured to receive credential 404 from credential verification system 104. As used in the current disclosure, a "credential" is an element of data or documentation used to validate a user's suitability to enter into a physical environment, such as an access right. In some embodiments, a credential may be used to validate of the user's legal identity, social identity, proof of creation, proof of interaction, proof of personhood, identify a vehicle, and the like. Credential 404 may also include any datum representing an identity, attribute, code, and/or characteristic specific to a user or a user's vehicle, including a VIN number. For example, and without limitation, the credential may include a license plate that is unique to the user's vehicle. In some embodiments, a plurality of indicators, such as, without limitation, one or more alphanumeric code on the license plate region captured and recognized by plurality of image capturing devices 108a-b, may be used as user credential; for instance, and without limitation, methods for capturing and recognizing the plurality of indicators using plurality of image capturing devices 108a-b may be consistent with any methods disclosed in U.S. patent application Ser. No. 18/195,537, filed on May 10, 2023, entitled "APPARATUS AND METHOD FOR AUTOMATIC LICENSE PLATE RECOGNITION OF A VEHICLE," which is incorporated by reference herein in its entirety. Other exemplary embodiments of credential may include, without limitation, RFID tag, universal product code (UPC), a barcode, cryptographic hashes, QR code, and the like.

In an embodiment, and with reference to FIG. 4A-B, credential verification system 104 depicted is capturing for a credential 404 of a vehicle 408 operate by a user. In such embodiment, credential 404 may be used to validate the user's identity or the vehicles identity. Vehicle 408 may include any means by which someone or something may be transported. As a non-limiting example, the vehicle 408 may include a car, SUV, sedan, hatchback, sports car, ATV, go cart, truck, bus, motorcycle, bicycle, watercraft, aircraft, snowcraft, and the like. In some cases, vehicle 408 may be configured to have multiple credentials 404 that are associated with it. In a non-limiting example, vehicle 408 may be configured to have two credentials associated with a front and a rear license plate, respectively. In an embodiment, credential 404 may be located on the dashboard, rearview mirror, front license plate, rear license plate, front windshield, rear windshield, driver's side windows, passenger's side windows, and the like of vehicle 408. Credential verification system 104 may be positioned according to the location of credential 404. In a non-limiting example, a credential verification system 104 may be mounted in an elevated position as described below with reference to FIG. 5. In other embodiments, a credential verification system may be mounted on the left or right side of vehicle 408. A credential verification system 104 may be mounted at or near the height of the vehicle 408, as depicted in FIGS. 4A-B. FIG. 4A may depict the use of multiple credential verification systems 104 to verify the credentials associated with the vehicle 408. FIG. 4B may depict an exemplary embodiment of apparatus 100 with multiple view windows 108. The embodiment of apparatus 100 depicted in FIG. 4B may include multiple credential verification system within housing. Each of these credential verification systems 104 may be aligned with a separate view window 144. Apparatus 100 may be configured to rotatably mounted. As used in the current disclosure, "rotatably mounted" is being securely mounted in a location while allowing for rotation along at least one axis. In some embodiments, the housing may be configured to be actuated to identify the credentials associated with each vehicle.

In another embodiment, and with reference to FIG. 4C, credential verification system 104 may be configured to identify a first credential 404a in a first view field 412a and a second credential 404b in a second view field 412b. Credential verification system 104 contained within apparatus 100 may include a first image capturing device 108a and second image capturing device 108b (not shown) as described above. In an embodiment, apparatus 100 may be mounted in the center of a pathway (e.g., road) to vehicle care site. A "vehicle care site," for the purpose of this disclosure, is a location or establishment that offers vehicle care (i.e., any activity, service, or feature that may be offered at a vehicle care site or in association with any vehicle service). In a non-limiting example, apparatus 100 may be mounted on any point of a printed lane marking of the road. First image capturing device 108a may be configured to capture a first credential 404a associated with a first vehicle 408a driving past or toward apparatus 100 and second image capturing device 108b may be configured to capture a second credential 404b associated with a second vehicle 408b driving past or toward apparatus 100, wherein the first vehicle 408a may travel on a first lane of the road while the second vehicle 408b may travel on a second lane of the road. In some cases, first lane and second lane may be in a same direction (e.g., entering vehicle care site, exiting vehicle care site, toward vehicle care devices, or the like). In other cases, first lane and second lane may be in a different directions (e.g., opposite directions, diverging directions, or the like). In a non-limiting example, first image capturing device 108a may include a first field of view (FOV) 412a towards first lane or a first group of lanes while second image capturing device 108b may include a second FOV 412b towards second lane or a second group of lanes. A "field of view," for the purpose of this disclosure, is the extent of an observable scene that an image capturing device can capture at any given moment, indicating a maximum range of vision of corresponding image capturing device in both horizontal and vertical planes. Both first and second image capturing devices 108a-b may be physically repositioned to point in different directions to capture different FOV 412a/b via a motorized pan-tilt mechanism, wherein the motorized pan-tilt mechanism may be configured to adjust the orientation of both image capturing devices 108a-b. Additionally, or alternatively, apparatus 100 may be mounted on any physical barrier (e.g., retaining walls, traffic islands or circles, planters or trees, and the like) constructed in the center of pathway used to separate the traffic.

Figure 5:
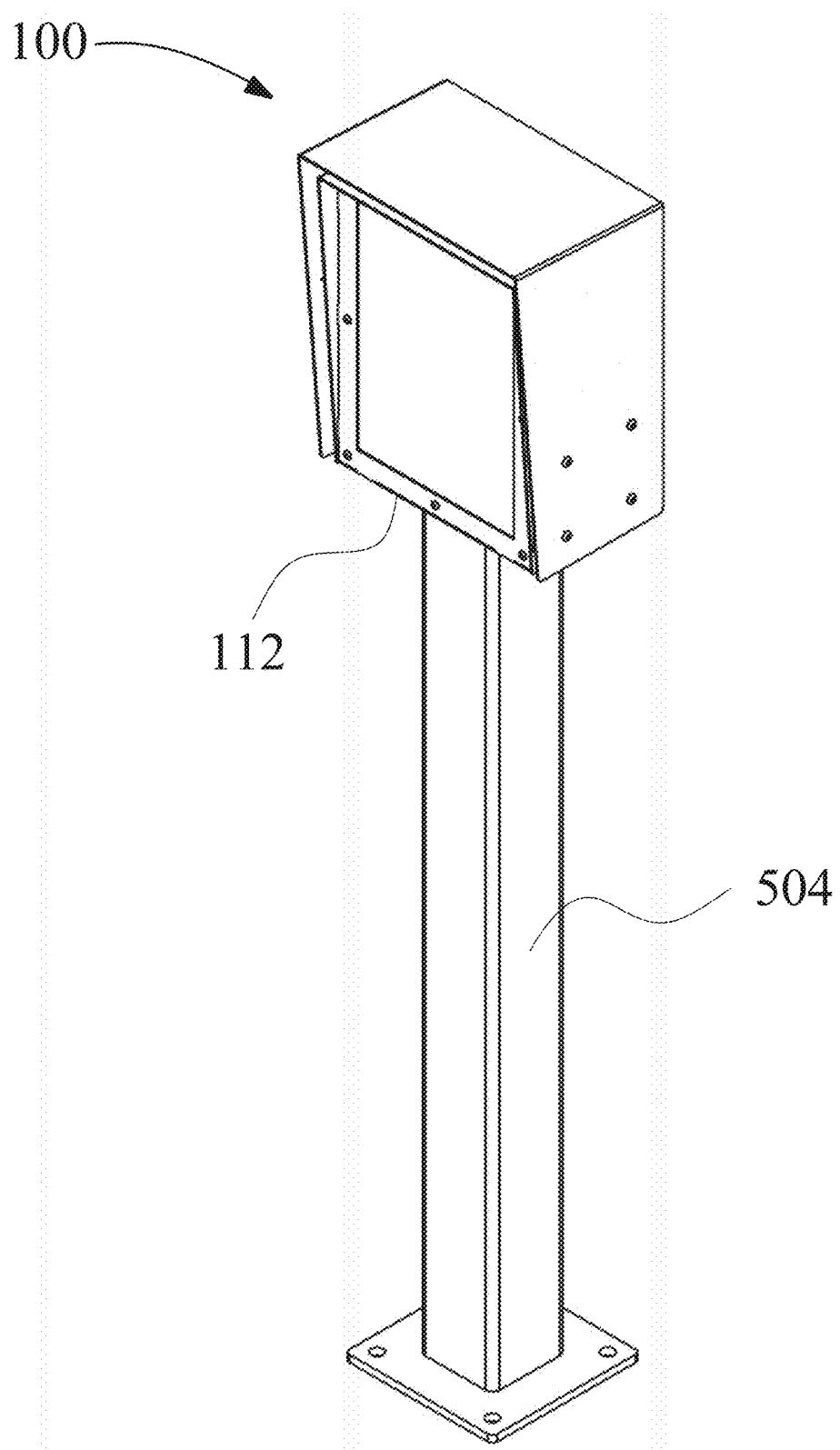
FIG. 5 is an exemplary embodiment of an elevated housing.

Now referring to FIG. 5, an exemplary embodiment of an elevated housing is illustrated. In some cases, housing may be disposed at an elevated height above the ground or a surface. Such elevation may allow apparatus 100 containing credential verification system 104 to align with the height of credential (e.g., license plate height on vehicle 408). In a non-limiting example, apparatus 100 may further include a housing stand 504. As used in this disclosure, a "housing stand" is a supporting structure or device that is designed to hold, secure, and position housing at a specific height and angle (e.g., 41 inches above the ground with bottom plate 112 parallel to the ground). Housing with housing stand 504 may enable enclosed credential verification system 104 to capture image data from a higher vantage point, providing a broader FOV 412a-b and/or potentially reducing the impact of obstacles or interference from nearby objects. Housing stand 504 may be mechanically attached to bottom plate 112. In some cases, housing stand 504 may be in a cylindrical shape. Additionally, or alternatively, housing stand 504 may be hollow, wherein the cables or wires of plurality of image capturing devices 108a-b may be routed from the ground along the interior of housing stand 504 through cable routing opening 228. In some cases, housing stand 504 may be fixed to the ground using a plurality of fasteners. In other cases, housing stand 504 may be portable. Further, housing stand 504 may be height adjustable. In a non-limiting example, housing stand 504 may include two or more stand sections that slide into one another. Height of housing attached to housing stand 504 may be adjusted, by extending or retracting stand sections to a desired level. Other exemplary embodiments of mechanisms installed on housing stand 504 to allow for changes in height of housing attached to housing stand 504 may include, without limitation, scissor mechanism, hydraulic or pneumatic adjustment, spring or counterbalance mechanism, electric motor adjustment, and the like.

In some cases, and still referring to FIG. 5, it may be desirable to camouflage housing containing credential verification system 104 and/or housing stand 504. In an embodiment, apparatus 100 may be blended into the surrounding environment, making apparatus 100 less noticeable or visually obtrusive. In a non-limiting example, colors and textures of elevated housing may match or closely resemble the surrounding environment of apparatus 100. For instance, and without limitation, housing and/or housing stand 504 apparatus 100 may be painted in shades that blend with nearby structures, foliage, or other elements. Alternatively, a textured coating may be applied to housing and/or housing stand 504 to mimic the appearance of nearby surfaces, such as, without limitation, brick, stone, or wood. Additionally, surrounding objects such as, without limitation, foliage, sings, any architectural elements may help to hide apparatus 100 from view.

Figure 6:
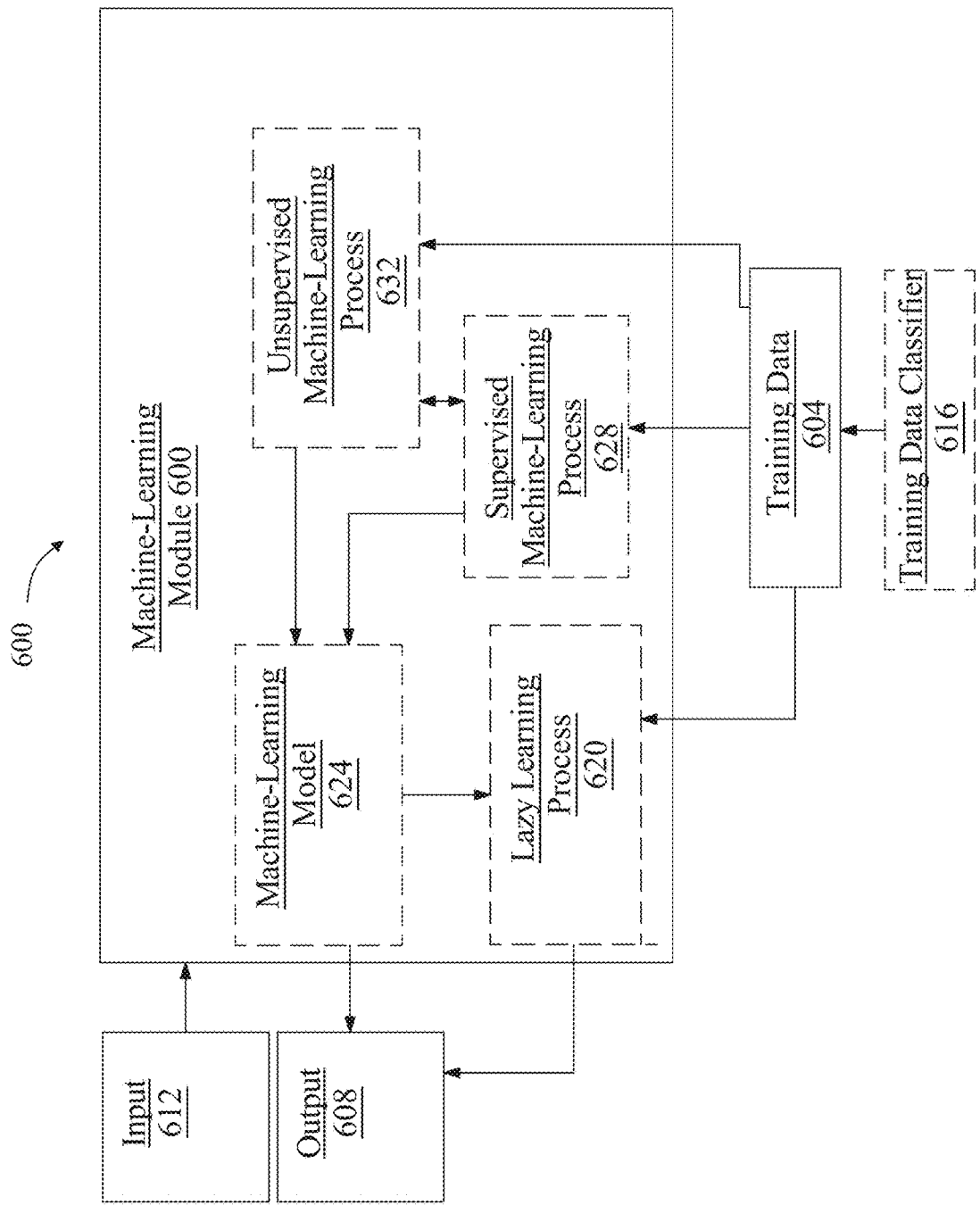
FIG. 6 is a block diagram of an exemplary machine-learning model.
Figure 7:
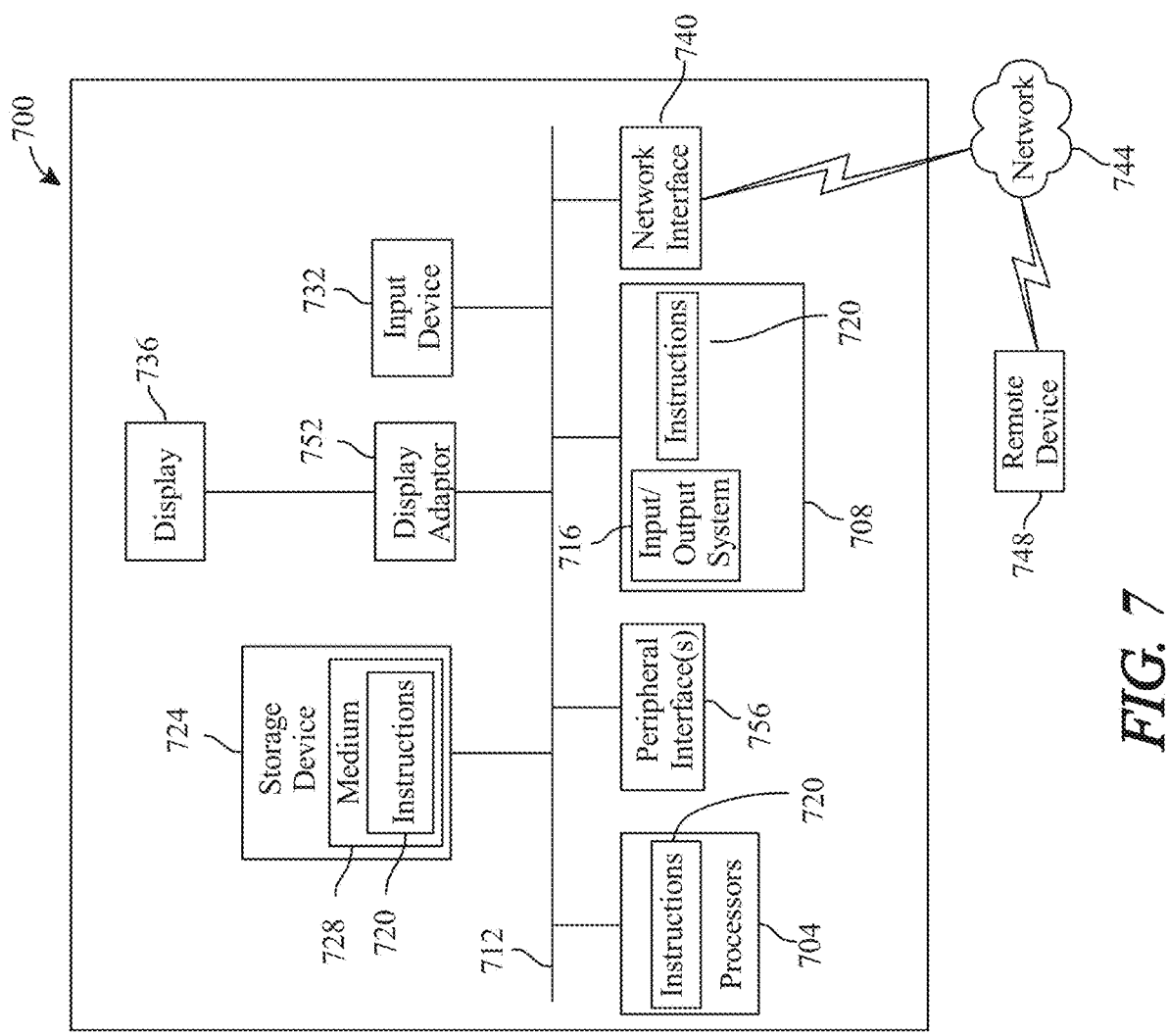
FIG. 7 is a block diagram of a computing system that can be used to implement any one or more of the methodologies disclosed herein and any one or more portions thereof.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example [describe inputs and outputs that might be used with invention].

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to [something that characterizes a sub-population, such as a cohort of persons and/or other analyzed items and/or phenomena for which a subset of training data may be selected].

Referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include [input examples] as described above as inputs, [output examples] as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a credential verification system with a water-resistant and tamper-proof housing, wherein the apparatus comprises:
   a credential verification system comprising a plurality of image capturing devices; and
   a housing configured to enclose the credential verification system, wherein the housing comprises:
      a multi-layer enclosure comprising a first set of vents;
      a bottom plate attached to the multi-layer enclosure, wherein the bottom plate comprises a second set of vents;
      an opening plate configured to mount the credential verification system, wherein the opening plate comprises:
         a mechanical interface configured to mechanically connect the opening plate to the bottom plate; and
         a locking mechanism configured to removably attach the opening plate to at least a rear edge of the multi-layer enclosure; and
      at least a view window removably attached to at least a front edge of the multi-layer enclosure and the bottom plate;
   wherein:
      the credential verification system is configured to identify a credential through the at least a view window using the plurality of image capturing device; and
      an airflow is directed from the second set of vents to the first set of vents.

2. The apparatus of claim 1, wherein each vent of the first set of vents comprises a first wire mesh.

3. The apparatus of claim 1, wherein each vent of the second set of vents comprises a second wire mesh.

4. The apparatus of claim 1, wherein the multi-layer enclosure comprises:
   a first layer enclosure; and
   a second layer enclosure fixed on top of the first layer enclosure using a first set of tamper-resistant hardware.

5. The apparatus of claim 4, wherein the first layer enclosure comprises at least a supporting structure.

6. The apparatus of claim 4, wherein the first set of vents is disposed on at least a surface of the first layer enclosure of the multi-layer enclosure.

7. The apparatus of claim 4, wherein the multi-layer enclosure comprises:
   an airgap located in between the first layer enclosure and the second layer enclosure configured to circulate the airflow from the first set of vents.

8. The apparatus of claim 4, wherein the bottom plate is attached to the first layer enclosure using a plurality of alignment feature.

9. The apparatus of claim 1, wherein the bottom plate comprises a cable routing opening.

10. The apparatus of claim 1, wherein the mechanical interface comprises at least a hinge configured to rotate the opening plate relative to the bottom plate.

11. The apparatus of claim 10, wherein the at least a hinge is configured to pivot the opening plate relative to the bottom plate at an opening angle of 135 degrees.

12. The apparatus of claim 1, wherein the opening plate comprises:
   an image capturing device mounting plate attached to the opening plate, wherein the image capturing device mounting plate is configured to secure the plurality of image capturing devices.

13. The apparatus of claim 12, wherein the image capturing device mounting plate comprises a universal camera standoff plate.

14. The apparatus of claim 1, wherein the credential verification system is configured to:
   identify a first credential in a first view field and a second credential in a second view field.

15. The apparatus of claim 1, wherein the credential comprises at least a license plate number associated with a vehicle.

16. The apparatus of claim 1, wherein the apparatus further comprises:
   a housing stand mechanically attached to the bottom plate, wherein the housing stand is height adjustable.

17. The apparatus of claim 1, wherein the at least a view window comprises a removable smoked polycarbonate window.

18. The apparatus of claim 17, wherein the at least a view window comprises:
   a frame attached to the removable smoked polycarbonate window using a second set of tamper-resistant hardware, wherein the frame is configured to seal the at least a view window.

19. The apparatus of claim 1, wherein the at least a view window is removably attached to the at least a front edge of the multi-layer enclosure and bottom plate using an interference fit.

20. The apparatus of claim 1, wherein the housing comprises a hydrophobic material.

* * * * *